United States Patent Office 3,147,255
Patented Sept. 1, 1964

3,147,255
PHENOTHIAZINE DERIVATIVES
Bernard Rudner, Pittsburgh, Pa., and Aristotle G. Prapas, Baltimore, Md., assignors to W. R. Grace & Co., New York, N.Y., a corporation of Connecticut
No Drawing. Filed Jan. 7, 1959, Ser. No. 785,325
11 Claims. (Cl. 260—243)

This invention relates to quaternary nitrogenous salts. In one specific aspect, it relates to phenothiazine compounds containing a hydrazinium-alkyl side chain.

It has been discovered that the phenothiazine derivatives of our invention exhibit anti-emetic and sedative properties as well as possessing other desirable attributes.

It is, therefore, an object of the present invention to provide a new class of pharmaceutically useful compounds.

The compounds of our invention are conveniently prepared by the action of chloramine on the appropriate tertiary amine. In the preferred practice of our invention, the reactant tertiary amine dissolved in an unreactive solvent is exposed to a stream of gaseous chloramine. The resultant phenothiazine hydrazinium chloride is isolated by conventional laboratory techniques. Compounds containing anions other than chloride are prepared by metathesis starting with the chloride and a compound containing the anion to be introduced.

In accordance with the present invention, we have made available a new class of compounds corresponding to the general formula:

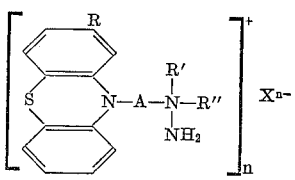

In the above formula, R is an annular substituent selected from the group consisting of hydrogen, halo, cyano, methyl and trifluoromethyl. R' and R" taken individually are lower alkyl radicals. R' and R" taken collectively with the nitrogen on which they are both substituents form a ring selected from the group consisting of morpholine, piperidine and piperazine. In addition the piperazine ring may be further substituted at the other nitrogen (or 4 position). Suitable substituents include lower alkyl, hydroxy lower alkyl, lower alkoxy lower alkyl and acetoxy lower alkyl radicals. A is a bivalent alkylene radical containing 2 to 4 carbon atoms. X is an anion bearing the charge $n$; $n$ also represents the number of cations required to balance the anionic charge.

When our compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of our novel compound resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartarate, diethylbarbiturate, penicillinate, camphorate, salicylamide, diphenylhydantoin, carbonate, cacodylate, aconitate, sulfamate, gentisate, malate and the like.

One method of preparing the novel compounds of our invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chlorination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230, filed August 20, 1956, now abandoned, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long colum of a solution comprising the tertiary amine dissolved in relatively cheap inert solvent. By inert solvent it is meant a solvent unreactive under the conditions of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellusolve my be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of our invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixure with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of our invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product is isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

In addition, our novel compounds can be prepared by the alkylation of unsymmetrical disubstituted hydrazines.

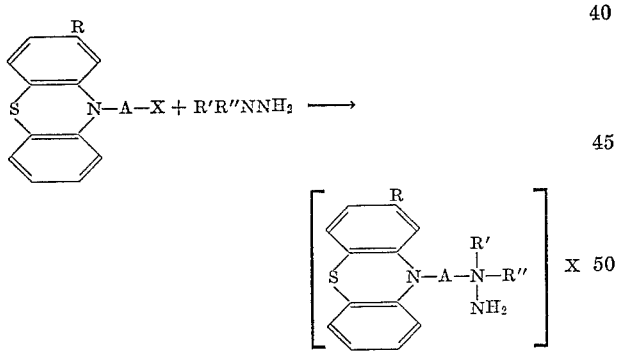

The scope and utility of our invention is further illustrated by the following examples:

*Example I*

Ten grams of the hydrochloride of 3-chloro-10-(3-dimethylaminopropyl) phenothiazine (thorazine, chloropromazine) was treated with aqueous sodium carbonate and the free amine extracted with 250 ml. of chloroform. The chloroform extract was dried and excess chloramine from the chloramine-ammonia generator previously described was passed into the solution. Evaporation of the filtrate after removal of the resultant ammonium chloride precipitate gave 8.3 g. of crude 1,1 - dimethyl - 1 - [3-(3-chlorophenothiazinyl - 10)propyl]hydrazinium chloride. The product was purified by washing with benzene, solution in water and treatment with charcoal. The residue obtained after evaporation of the water was recrystallized from methyl alcohol-ethyl acetate to give off-white hygroscopic crystals of pure product melting 89–90° C. and having the structure shown below. Analysis of the product gave 11.6% N, 8.62% S and 18.7% Cl. Calculated for $C_{17}H_{21}N_3SCl_2$: 11.4% N, 8.64% S and 19.2% Cl.

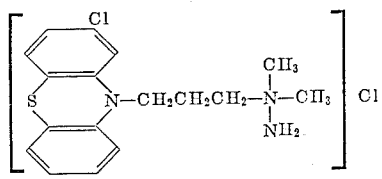

*Example II*

Separate portions of an aqueous solution of the product of Example I were treated with aqueous solutions of potassium hexafluorophosphate, picric acid, potassium iodide, silver nitrate, sodium benzoate, sodium tannate, and sodium gluconate to get the 1,1-dimethyl-1-[3-(3-chlorophenothiazinyl-10)propyl]hydrazinium hexafluorophosphate, picrate, iodide, nitrate, benzoate, tannate and gluconate respectively. The hydrazinium hexafluorophosphate, picrate and iodide were crystalline solids melting 119° C., 131–132° C. and 118–119° C. respectively, the nitrate and gluconate were very water soluble, the benzoate was a somewhat water soluble hydrate melting around 150° C. and the tannate was a dark solid melting above 200° C.

*Example III*

Equal quantities of sodium o-acetoxybenzoate and the hydrazinium chloride of Example I were refluxed together for 30 minutes in an isopropyl alcohol solution. After a hot filtration to remove the sodium chloride formed, the filtrate was cooled to yield 1,1-dimethyl-1-[3 - (3 - chlorophenothiazinyl - 10)propyl]hydrazinium o-acetoxybenzoate which separated out as a crystalline precipitate melting 148–149° C.

*Example IV*

A solution of 100 mg. of hydroxylamine-o-sulfonic acid in 20 ml. of methyl alcohol was added slowly to a solution of 100 mg. of thorazine and an equal weight of sodium methylate in 10 ml. of ethyl alcohol. After the addition had been completed, the reaction mixture was boiled for a half hour keeping the volume constant by the addition of ethyl alcohol. The reaction mixture was poured into an excess of water, the aqueous system brought to a pH of 8.5 by the addition of dilute sulfuric acid and evaporated to dryness at room temperature. The product, 1,1-dimethyl-1-[3-(3-chlorophenothiazinyl-10)propyl]hydrazinium sulfate, was extracted with and recrystallized from isopropyl alcohol to give the pure product melting ca. 186–187° C. and having the structure

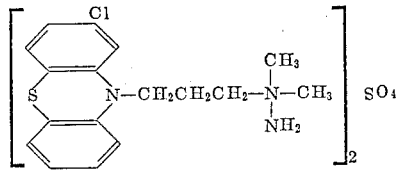

*Example V*

An aqueous solution of 20 mg. of sodium 5,5-diethylbarbiturate and 30 mg. of the hydrazinium sulfate of the previous example was boiled for a few minutes and allowed to cool. On chilling, white needles of 1,1-dimethyl-1-[3-(3-chlorophenothiazinyl-10)propyl]hydrazinium 5,5-diethylbarbiturate melting 196–197° C. separated from solution.

*Example VI*

Using the approach of Example I, about half a gram of 10-(2-dimethylaminopropyl-1)phenothiazine (Phenergan) was reacted in chloroform solution with chloramine. Evaporation of the filtrate after separation of ammonium chloride gave crude 1,1-dimethyl-1-[1-(phenothiazinyl-10)propyl-2] hydrazinium chloride as a thick oil. After several recrystallizations from ethyl alcohol-ethyl acetate, the pure product was an extremely hygroscopic white crystalline solid which lost solvent at about 80° C. and melted 186–188° C., it has the structure

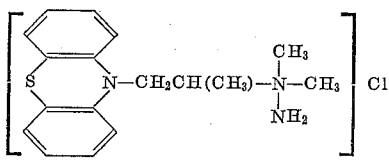

*Example VII*

Separate portions of an aqueous solution of the hydrazinium chloride of the previous example were treated with aqueous solutions of potassium hexafluorophosphate, silver nitrate, sodium benzoate, sodium tannate and sodium gluconate to get the 1,1-dimethyl-1-[1-(phenothiazinyl-10)propyl-2]hydrazinium hexafluorophosphate, nitrate, benzoate, tannate and gluconate respectively. The hydrazinium hexafluorophosphate was a solid melting about 146° C., the nitrate and gluconate was very water soluble, the benzoate was a somewhat water soluble hydrate melting around 148° C. and the tannate was a dark solid melting above 200° C.

*Example VIII*

Equal quantities of sodium citrate and the hydrazinium chloride of Example VI were refluxed together for two hours in an ethyl alcohol solution. After cooling and filtration from the sodium chloride formed, the reaction mixture was poured into an excess of chloroform causing 1,1 - dimethyl - 1-[1-(phenothiazinyl-10)propyl-2]hydrazinium citrate to separate. The product was a hygroscopic white solid decomposing about 180° C.

*Example IX*

Using the approach of Example I, 3-chloro-10-[3-(4-methylpiperazino-1)propyl]phenothiazine (Prochlorperazine, Compazine) was reacted in chloroform solution with chloramine. Crude 1-amino-4-methyl-1-[3-(3-chlorophenothiazinyl-10)propyl]piperazinium chloride was isolated by evaporation of the solvent. After purification, the product melted 201–203° C. and is believed to have the structure shown below. It formed a picrate melting ca. 156° C.

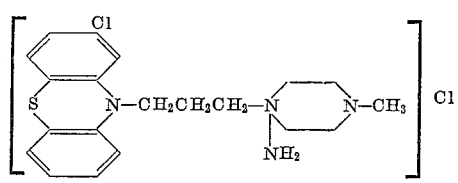

*Example X*

The purpose of this example is to demonstrate the antiemetic properties of our novel compounds. Healthy mongrel dogs of both sexes were used in this study. It was initially determined that an intravenous dose of 0.01 mg. of apomorphine hydrochloride would induce emesis in an average dog. The test compounds were administered intravenously to the animals 30 minutes prior to the challenge dose determined above. The animals were observed particularly for nausea, retching and emesis. Nausea was determined by excessive salivation with frequent swallowing; retching was determined by labored rhythmic activity of the respiratory musculature; and vomiting or emesis was determined by the forceful expulsion of the gastrointestinal contents through the mouth.

A 20 mg./ml. solution of 1,1-dimethyl-1-[3-(3-chlorophenothiazinyl-10)propyl]hydrazinium chloride in physiological saline was prepared and administered to eight dogs at a level of 2.0 mg./kg. of body weight. Five of the eight animals failed to show emesis following the challenge dose of apomorphine. Slight nausea was observed in those animals which did not vomit. Following the intravenous administration of the test compound, the animals became sedated.

| Solution | Dogs Tested | Dogs Vomiting |
|---|---|---|
| Control | 5 | 5 |
| Test | 8 | 3 |

*Example XI*

The purpose of this test was to further demonstrate the sedative power of our novel compounds. The activity cages used in this study to measure spontaneous motor activity were Actophotometers (Metro Industries). The cage is circular in shape and has a diameter of 13 inches. The lower portion of the cage is cross-hatched at the animals level by six light beams activating six photo cell units. The light beams are spaced to provide the internal area with cross-hatched light paths two inches square so that it is almost impossible for the animal to move without causing a circuit break which is recorded on a six-digit counter. An infra-red filter mounted in front of each light beam prevents the light source from disturbing the animal. The activity cages are located in an isolated, relatively sound-proof and completely light-proof room.

Male albino rats were housed individually in the isolated room. The lights in the room were controlled by time switches so that the lights turned on at 6:00 p.m. and off at 6:00 a.m. This reversal of the light-dark cycle was necessary since rodents have more spontaneous activity in darkness than in a lighted area. After the animals had been allowed several weeks to accommodate to this readjusted light-dark cycle and become accustomed to the activity cages, the actual test was begun. The rats, five or six to a group, were placed individually in the activity cages and a two-hour count was made to establish control values for spontaneous motor activity. The test compounds were administered intraperitoneally and the animals replaced in the activity cages. The two-hour experimental count was begun 30 minutes after injection of the test compounds. The cage room was always dark during the test periods and animals were not reused during the course of the study. Physiological saline solutions containing 1.0 and 2.5 mg./ml. of 1,1-dimethyl-1-[3-(3-chlorophenthiazinyl-10)propyl]hydrazinium chloride were used as the test solutions. A summary of the results obtained is tabulated below.

| Dose, mg./kg. | No. of Rats | Percent Initial Activity |
|---|---|---|
| 0 (control) | 6 | 100.0 |
| 1 | 12 | 56.9 |
| 5 | 5 | 31.9 |

We claim:

1. Compounds having the formula:

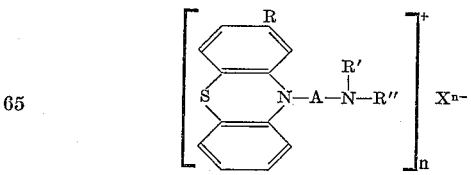

wherein R is a member selected from the group consisting of hydrogen, halo, cyano, methyl and trifluoromethyl; R' and R" taken individually are lower alkyl radicals; R' and R" taken collectively with the nitrogen form a ring selected from the group consisting of morpholine, piperidine, piperazine, 4-lower alkyl piperazine, 4-(hydroxy lower alkyl) piperazine, 4-(lower alkoxy lower alkyl)

piperazine and 4-(acetoxy lower alkyl) piperazine; A is an alkylene radical containing 2 to 4 carbon atoms; $n$ is an integer less than four; and X is a pharmaceutically acceptable anion.

2. The compounds according to claim 1 wherein R is halo and R' and R" are lower alkyl.

3. The compounds according to claim 1 wherein R is hydrogen and R' and R" are lower alkyl.

4. The compounds according to claim 1 wherein R is halo and R' and R" taken collectively with the nitrogen on which they are both substituents form the 4-lower alkyl piperazine ring.

5. 1,1 - dimethyl - 1 - [3-(3-chlorophenothiazinyl-10)-propyl]hydrazinium chloride.

6. 1,1 - dimethyl - 1 - [3-(3-chlorophenothiazinyl-10)-propyl]hydrazinium o-acetoxybenzoate.

7. 1,1 - dimethyl - 1 - [3-(3-chlorophenothiazinyl-10)-propyl]hydrazinium sulfate.

8. 1,1-dimethyl - 1 - [1-(phenothiazinyl-10)propyl-2]-hydrazinium chloride.

9. 1,1-dimethyl - 1 - [1-(phenothiazinyl-10)propyl-2]-hydrazinium citrate.

10. 1-amino-4-methyl - 1 - [3-(3-chlorophenothiazinyl-10)propyl]piperazinium chloride.

11. 1-amino-4-methyl - 1 - [3-(3-chlorophenothiazinyl-10)propyl]piperazinium picrate.

References Cited in the file of this patent

UNITED STATES PATENTS

| | | |
|---|---|---|
| 2,590,125 | Robinson et al. | Mar. 25, 1952 |
| 2,734,057 | Gailliot et al. | Feb. 7, 1956 |
| 2,830,050 | Biel | Apr. 9, 1958 |
| 2,838,507 | Cusic | June 10, 1958 |
| 2,848,450 | Rudner et al. | Aug. 19, 1958 |
| 2,891,060 | Rudner | June 16, 1959 |
| 2,899,424 | Rudner | Aug. 11, 1959 |
| 2,899,432 | Rudner | Aug. 11, 1959 |
| 2,921,069 | Ullyot | Jan. 12, 1960 |
| 2,927,111 | Biel | Mar. 1, 1960 |
| 2,928,767 | Gulesich et al. | Mar. 15, 1960 |
| 2,955,108 | Omietanski | Oct. 4, 1960 |

FOREIGN PATENTS

| | | |
|---|---|---|
| 551,400 | Belgium | Mar. 29, 1957 |
| 552,557 | Belgium | May 13, 1957 |
| 332,665 | Switzerland | Oct. 31, 1958 |

OTHER REFERENCES

Sherlock et al.: 131st Meeting of American Chemical Society (1957), Abstracts of Papers, page 18N–19N.

Protiva: Chem. Listy, vol. 47, pp. 1481–5 (1953), Hydrazine Digest.